United States Patent
Wang

(10) Patent No.: US 9,536,285 B2
(45) Date of Patent: Jan. 3, 2017

(54) IMAGE PROCESSING METHOD, CLIENT, AND IMAGE PROCESSING SYSTEM

(71) Applicant: Tencent Technology (Shenzhen) Company Limited, Shenzhen (CN)

(72) Inventor: Hui Wang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 14/105,107

(22) Filed: Dec. 12, 2013

(65) Prior Publication Data

US 2014/0093184 A1 Apr. 3, 2014

Related U.S. Application Data

(63) Continuation of application No. PCT/CN2013/076253, filed on May 27, 2013.

(30) Foreign Application Priority Data

Jul. 11, 2012 (CN) .......................... 2012 1 0239289

(51) Int. Cl.
G06K 9/40 (2006.01)
G06T 5/00 (2006.01)
H04N 1/00 (2006.01)

(52) U.S. Cl.
CPC ............ *G06T 5/00* (2013.01); *H04N 1/00137* (2013.01); *H04N 1/00167* (2013.01);
(Continued)

(58) Field of Classification Search
CPC ... G06T 5/00; H04N 1/00137; H04N 1/00167; H04N 1/00244; H04N 2201/001; H04N 2201/0084
(Continued)

(56) References Cited

U.S. PATENT DOCUMENTS 6,463,426 B1* 10/2002 Lipson .............. G06F 17/30247
8,077,931 B1* 12/2011 Chatman ............... G06T 7/0012
382/118
(Continued)

FOREIGN PATENT DOCUMENTS

CN 101261984 A 9/2008
CN 101594451 12/2009
(Continued)

OTHER PUBLICATIONS

Tencent Technology, ISRWO, PCT/CN2013/076253, Aug. 1, 2013, 9 pgs.
(Continued)

*Primary Examiner* — Mekonen Bekele
(74) *Attorney, Agent, or Firm* — Morgan, Lewis & Bockius LLP

(57) ABSTRACT

An image processing method, a client device, and an image processing system are provided. The method includes: detecting by a client device an image to be processed to obtain image information, and uploading the image information to a server; receiving by the client device at least one case related to the image, the at least one case being obtained by the server according to the image information and sent by the server; and processing the image by the client device according to the at least one case related to the image. The client device includes: a detection module, a receiving module, and a processing module. The system includes the foregoing client device and a server, where the server includes: a receiving module, a selection module, and a sending module. The method not only achieves simple and fast image processing but also improves adjustability during the processing process.

18 Claims, 11 Drawing Sheets

(52) U.S. Cl.
CPC ... *H04N 1/00244* (2013.01); *H04N 2201/001* (2013.01); *H04N 2201/0084* (2013.01)

(58) Field of Classification Search
USPC .................................................. 382/154–285
See application file for complete search history.

(56) References Cited

U.S. PATENT DOCUMENTS

| | | | |
|---|---|---|---|
| 8,175,420 B2 | 5/2012 | Sposato et al. | |
| 2002/0163527 A1* | 11/2002 | Park | G09G 5/003 345/594 |
| 2003/0011612 A1* | 1/2003 | Luo | H04N 1/644 345/589 |
| 2004/0105007 A1* | 6/2004 | Takagi | H04N 5/23212 348/207.1 |
| 2005/0142654 A1* | 6/2005 | Matsumoto et al. | 435/287.1 |
| 2007/0183656 A1* | 8/2007 | Kuwahara et al. | 382/162 |
| 2011/0010629 A1* | 1/2011 | Castro | G06F 3/1462 715/732 |
| 2011/0320463 A1* | 12/2011 | Yoshio | 707/749 |
| 2012/0201450 A1* | 8/2012 | Bryant et al. | 382/162 |
| 2012/0201451 A1* | 8/2012 | Bryant | H04N 1/60 382/164 |
| 2012/0201452 A1* | 8/2012 | Pettigrew et al. | 382/165 |

FOREIGN PATENT DOCUMENTS

| | | | |
|---|---|---|---|
| CN | 101901785 A | 12/2010 | |
| CN | 102387287 A | 3/2012 | |
| CN | 102479220 A | 5/2012 | |
| JP | 2005078590 A | * 3/2005 | ............... G06T 1/00 |

OTHER PUBLICATIONS

Tencent Technology, IPRP, PCT/CN2013/076253, Jan. 13, 2015, 7 pgs.

* cited by examiner

IMAGE PROCESSING METHOD, CLIENT, AND IMAGE PROCESSING SYSTEM

RELATED APPLICATIONS

This application is a continuation application of PCT Patent Application No. PCT/CN2013/076253, entitled "IMAGE PROCESSING METHOD, CLIENT, AND IMAGE PROCESSING SYSTEM" filed on May 27, 2013, which claims priority to Chinese Patent Application No. 201210239289.3, entitled "IMAGE PROCESSING METHOD, CLIENT, AND IMAGE PROCESSING SYSTEM," filed on Jul. 11, 2012, both of which are incorporated by reference in their entirety.

TECHNICAL FIELD

The present invention relates to the field of image processing, and in particular, to an image processing method, a client device, and an image processing system.

BACKGROUND

Images are a main source for human beings to obtain and exchange information. Therefore, the application field of image processing is definitely associated with various aspects of human life and work. With the development of science and technology, the application field of the image processing technology also expands, and people have higher and higher requirements for the effect and usability on image processing.

Currently, implementation of image processing is mainly classified into two categories:

The first is hardware implementation, which includes algorithms set in photo image capture devices, and is capable of achieving functions such as automatic white balance adjustment and special color effect adjustment. Different products usually have different adjustment preferences. Taking the photo color as an example, digital cameras of some brands take bright-colored images, while digital cameras of other brands take soft-colored and neutral-colored images. These characteristics are usually implemented through algorithms set in cameras.

The second manner is software implementation, which mainly includes easy-to-use automation software and professional software. Several predefined effect modes are usually set in easy-to-use automation software, and a user may select a specific mode according to the required effect. Easy-to-use automation software, such as nEO iMAGING, is relatively easy to use. Professional software, such as photoshop, provides a lot of adjustment means, and the output effect thereof is not limited, so that users are provided with more choices.

During the implementation of the present invention, the inventor finds that the prior art has at least the following problems:

The hardware product has a fixed processing style, which affects the effect of the processed image; the easy-to-use automation image processing software only provides small adjustability; and the professional image processing software is difficult to use.

SUMMARY

In order to achieve simple and fast image processing and improve adjustability during the processing, embodiments of the present invention provide an image processing method, a client device, and an image processing system. The technical solutions are described as follows:

An image processing method is provided, which includes:

detecting by a client device an image to be processed to obtain image information, and uploading the image information to a server;

receiving at least one case related to the image by the client device, the at least one case being obtained by the server according to the image information and sent by the server; and processing the image by the client device according to the at least one case related to the image.

The processing the image by the client device according to the at least one case related to the image includes:

applying by the client device to the image an effect of a case selected from the at least one case related to the image;

and/or, applying by the client device to the image an adjustment parameter set by a user according to the at least one case related to the image.

The applying by the client device to the image the effect of the case selected from the at least one case related to the image includes:

selecting by the client device a case having a highest similarity to the image from the at least one case related to the image; and applying by the client device to the image an effect of the case having the highest similarity.

After the applying by the client device to the image the effect of the case selected from the at least one case related to the image, the method further includes:

obtaining by the client device a processing step of the image in the application process; and uploading by the client device the processing step to the server.

After the applying by the client device to the image the adjustment parameter set by the user according to the at least one case related to the image, the method further includes:

obtaining by the client device a processing step of the image in the application process; and uploading by the client device the processing step and the adjustment parameter to the server.

After the processing the image by the client device according to the at least one case related to the image, the method further includes:

if the user confirms to upload the processed image, uploading by the client device the processed image to the server.

After the detecting by the client device the image to be processed to obtain the image information, and uploading the image information to the server, the method further includes:

receiving by the server the image information, and calculating a similarity between each of the stored cases and the image according to the image information;

selecting by the server at least one case related to the image according to a descending order of the calculated similarities; and sending by the server the at least one case related to the image to the client device.

After the detecting by the client device the image to be processed to obtain the image information, and uploading the image information to the server, the method further includes:

receiving by the server the image information, and searching stored cases for a related case according to the image information;

calculating by the server a similarity between each found case and the image according to the image information;

selecting by the server at least one case related to the image according to a descending order of the calculated the similarities; and sending by the server the at least one case related to the image to the client device.

A client device is provided, including: a detection module, a receiving module, and a processing module, where the detection module is configured to detect an image to be processed to obtain image information, and upload the image information to a server;

the receiving module is configured to receive at least one case related to the image, the at least one case being obtained by the server according to the image information and sent by the server; and the processing module is configured to process the image according to the at least one case related to the image.

The processing module includes:

an effect application unit, configured to apply to the image an effect of a case selected from the at least one case related to the image;

and/or, a parameter adjustment unit, configured to apply to the image an adjustment parameter set by a user according to the at least one case related to the image.

The effect application unit is specifically configured to:

select a case having a highest similarity to the image from the at least one case related to the image; and apply to the image an effect of the case having the highest similarity.

The processing module further includes:

a first processing unit, configured to: after the effect application unit applies to the image the effect of the case selected from the at least one case related to the image, obtain a processing step of the image in the application process, and upload the processing step to the server.

The processing module further includes:

a second processing unit, configured to: after the parameter adjustment unit applies to the image the adjustment parameter set by the user according to the at least one case related to the image, obtain a processing step of the image in the application process, and upload the processing step and the adjustment parameter to the server.

The client device further includes:

an upload module, configured to: after the processing module processes the image according to the at least one case related to the image, upload the processed image to the server if the user confirms to upload the processed image.

An image processing system is provided, including: the foregoing client device and a server that includes a receiving module, a selection module, and a sending module, where the receiving module is configured to receive image information of an image to be processed sent by the client device;

the selection module is configured to select at least one case related to the image from multiple stored cases according to the image information; and the sending module is configured to send to the client device the at least one case related to the image selected by the selection module.

The selection module specifically includes:

a first calculation unit, configured to calculate a similarity between each of the stored cases and the image according to the image information; and a first selection unit, configured to select at least one case related to the image according to a descending order of the calculated similarities.

Alternatively, the selection module specifically includes:

a search unit, configured to search stored cases for a related case according to the image information;

a second calculation unit, configured to calculate a similarity between each found case and the image according to the image information; and a second selection unit, configured to select at least one case related to the image according to a descending order of the calculated similarities.

In accordance with some embodiments, an image processing method is performed at a server have one or more processors and memory for storing programs to be executed by the processors. The server receives a set of parameters from a client device, the set of parameters including image capture parameters associated with an image stored at the client device. In response, the server selects and ranks a set of images based on a similarity analysis between the received image capture parameters and image capture parameters associated with the set of images. The server then determines a set of image adjustment parameters based on a ranking of the set of images and returns the determined set of image adjustment parameters to the client device.

In accordance with some embodiments, a server comprises one or more processors, memory, and one or more programs stored in the memory and to be executed by the processors, the programs further including instructions for: receiving a set of parameters from a client device, the set of parameters including image capture parameters associated with an image stored at the client device; selecting and ranking a set of images based on a similarity analysis between the received image capture parameters and image capture parameters associated with the set of images; determining a set of image adjustment parameters based on a ranking of the set of images; and returning the determined set of image adjustment parameters to the client device.

The technical solutions provided by the embodiments of the present invention has the following beneficial effects: image information of an image to be processed is detected and uploaded to a server; a client device receives a case related to the image sent by the server, and then processes the image to be processed through the case related to the image, thereby not only achieving simple and fast image processing and but also improving adjustability during the processing.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the present invention more clear, the following further describes the embodiments of the present invention in detail with reference to the accompanying drawings.

Embodiment 1

Figure 1:
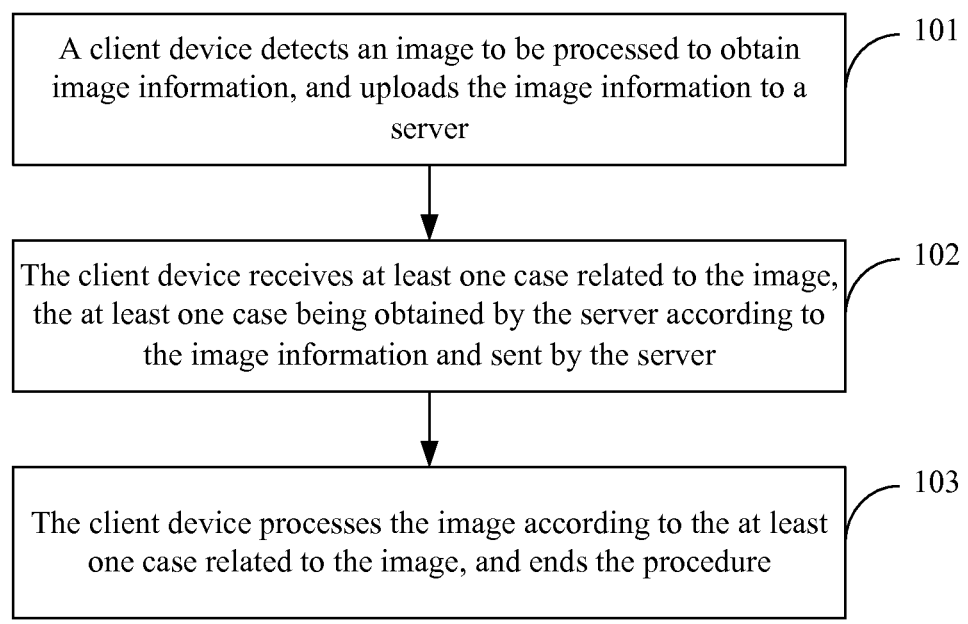
FIG. 1 is a flow chart of an image processing method according to Embodiment 1 of the present invention.

Referring to FIG. 1, this embodiment provides an image processing method, which includes the following steps:

Step 101: A client device detects an image to be processed to obtain image information, and uploads the image information to a server.

Step 102: The client device receives at least one case related to the image, the at least one case being obtained by the server according to the image information and sent by the server.

Step 103: The client device processes the image according to the at least one case related to the image, and ends the procedure.

Through the image processing method provided by this embodiment, image information of an image to be processed is detected and uploaded to a server; a client device receives a case related to the image sent by the server, and then processes the image to be processed through the case related to the image, which not only implements simple and fast image processing but also improves adjustability during the processing.

Embodiment 2

Figure 2:
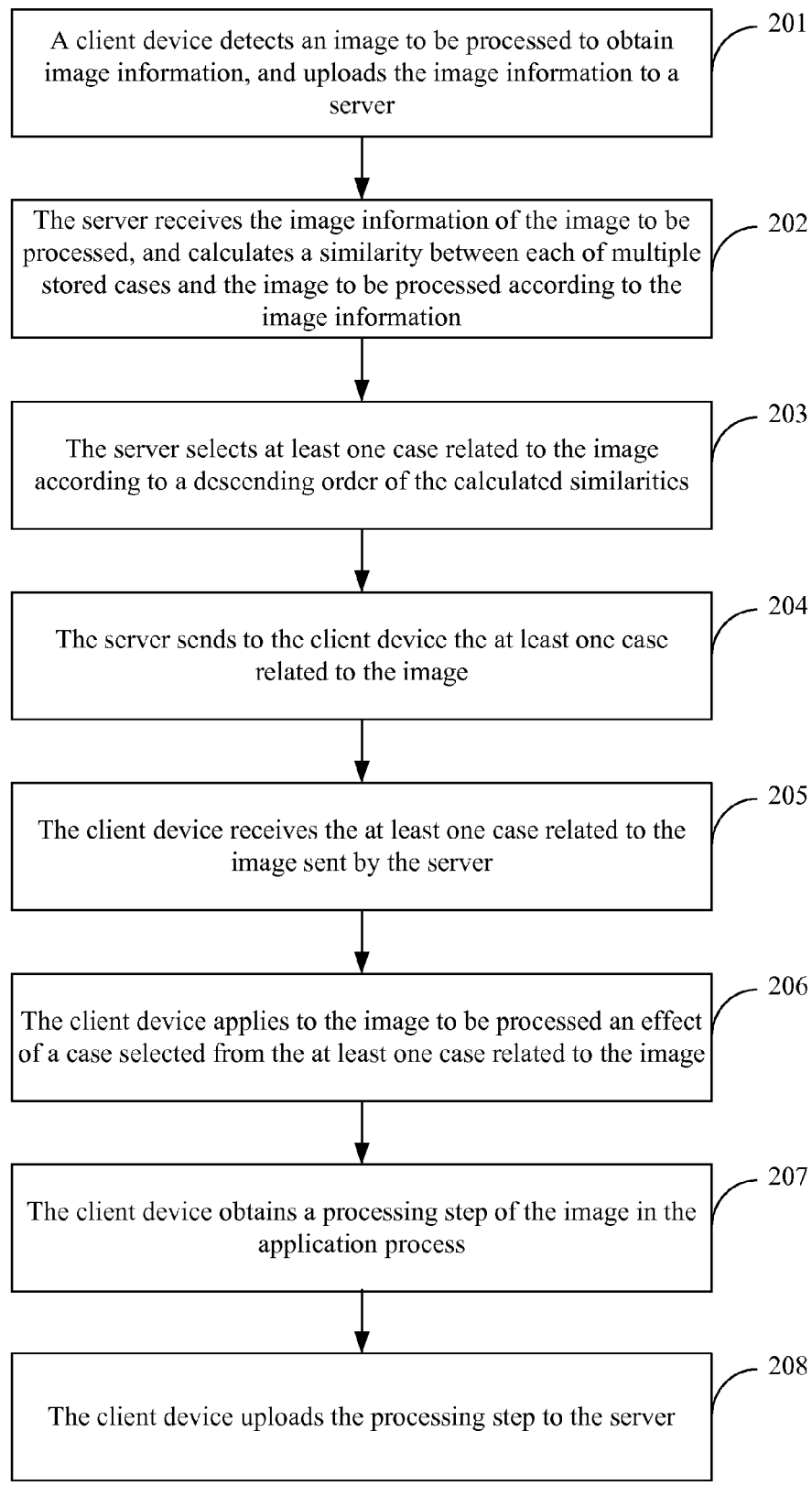
FIG. 2 is a flow chart of an image processing method according to Embodiment 2 of the present invention.

Referring to FIG. 2, this embodiment provides another image processing method, which includes the following steps:

Step 201: A client device detects an image to be processed to obtain image information, and uploads the image information to a server.

In this embodiment, the image information of the image to be processed may include the image and image capture parameters of the image, where the image capture parameters of the image may include an exposure value, a light-measure mode, a focus position, ISO (light sensitiveness) data, white balance, image capture time, image capture device information (such as lens information of a camera), a Global Positioning System (GPS) coordinate, and so on that are set in the camera when an image is shot.

Apart from uploading the image information of the image to be processed, the client device may further upload information such as a color space of a display terminal used by a user.

Step 202: The server receives the image information of the image to be processed, and calculates, according to the image information, a similarity between each of stored cases and the image to be processed.

In this embodiment, the server pre-stores multiple cases, where the case refers to information related to image processing. Each case includes but is not limited to: image information of an image, a processed image, corresponding processing steps, adjustment parameters, and so on. An Euclidean distance calculation method can be used to calculate a similarity between a case and the image to be processed, and definitely, other methods can also be used; the method is not limited in the present disclosure.

Furthermore, in order to reduce the calculation amount and improve the response speed of the server, Step 202 may be replaced by the following procedures:

the server receives the image information, and searches stored cases for a related case according to the image information; and the server calculates a similarity between each found case and the image according to the image information.

Step 203: The server selects at least one case related to the image according to a descending order of the calculated similarities.

In this embodiment, methods for the server to select at least one case related to the image according to the descending order of the calculated similarities include but are not limited to the following ones:

sequencing the obtained similarities in an ascending order, and selecting cases corresponding to a designated number of similarities from the sequence in a backward manner.

or, sequencing the obtained similarities in a descending order, and selecting cases corresponding to a designated number of similarities from the sequence in a forward manner.

or, setting a threshold, comparing all the obtained similarities with the threshold one by one, and selecting cases corresponding to similarities greater than the threshold.

Furthermore, the server may select the case related to the image according to other reference factors. The reference factors include but are not limited to: the number of times that a case is selected and sent to the client device, and the number of times that a case is applied. For example, the server may select some cases from the stored cases according to the similarity, then filter the selected cases according to the number of times that the cases are applied, and finally send the case that remains after the filtering to the client device.

Step 204: The server sends to the client device the at least one case related to the image.

Step 205: The client device receives the at least one case related to the image sent by the server.

Step 206: The client device applies, to the image to be processed, an effect of a case selected from the at least one case related to the image.

Step 206 may specifically include the following procedures:

the client device selects a case having a highest similarity to the image from the at least one case related to the image; and the client device applies to the image an effect of the case having the highest similarity.

Step 207: The client device obtains a processing step of the image in the foregoing application process.

Step 208: The client device uploads the processing step to the server, and ends the procedure.

If the user confirms to upload the processed image, the client device may further upload the processed image to the server. Specifically, after processing the image, the client device may display a prompt box "Allow uploading this image?" on a display interface; if the user clicks "yes", the client device sends the processed image and the processing step together to the server, or separately sends the processed image and the processing step to the server. If the user clicks "no", the client device notifies the server to delete the unprocessed image in the uploaded image information.

In this embodiment, when receiving information uploaded by the client device, the server may store the received information, where the information includes the image information of the image, the processed image and the corresponding processing step. Furthermore, the client device may perform data conversion on the stored information to obtain a current case, and then carry out a statistical analysis about information classifications on the current case and stored cases, where a method of the statistical analysis belongs to such fields as artificial intelligence, data mining, and pattern recognition, for example, a decision tree is used. A current statistical analysis result is obtained after the data statistical analysis. The server updates the statistical analysis result by replacing a stored statistical analysis result with the current statistical analysis result, so as to add the current case into the stored cases.

Correspondingly, when the server calculates the similarity between each stored case and the image to be processed, the server may first search the stored cases for a case related to the image to be processed according to the image information and the statistical analysis result, and then calculate a similarity between the found case and the image to be processed, so as to reduce the number of cases of which the similarities need to be calculated, thereby significantly reducing the calculation amount of the server, and improving the response speed of the server.

In the image processing method provided by this embodiment, image information of an image to be processed is detected and uploaded to a server; a client device receives cases related to the image sent by the server, and directly applies to the image an effect of a case selected from the received cases, so that the image obtains the same processing effect as the selected case, thereby achieving simple and fast image processing.

Figure 3:
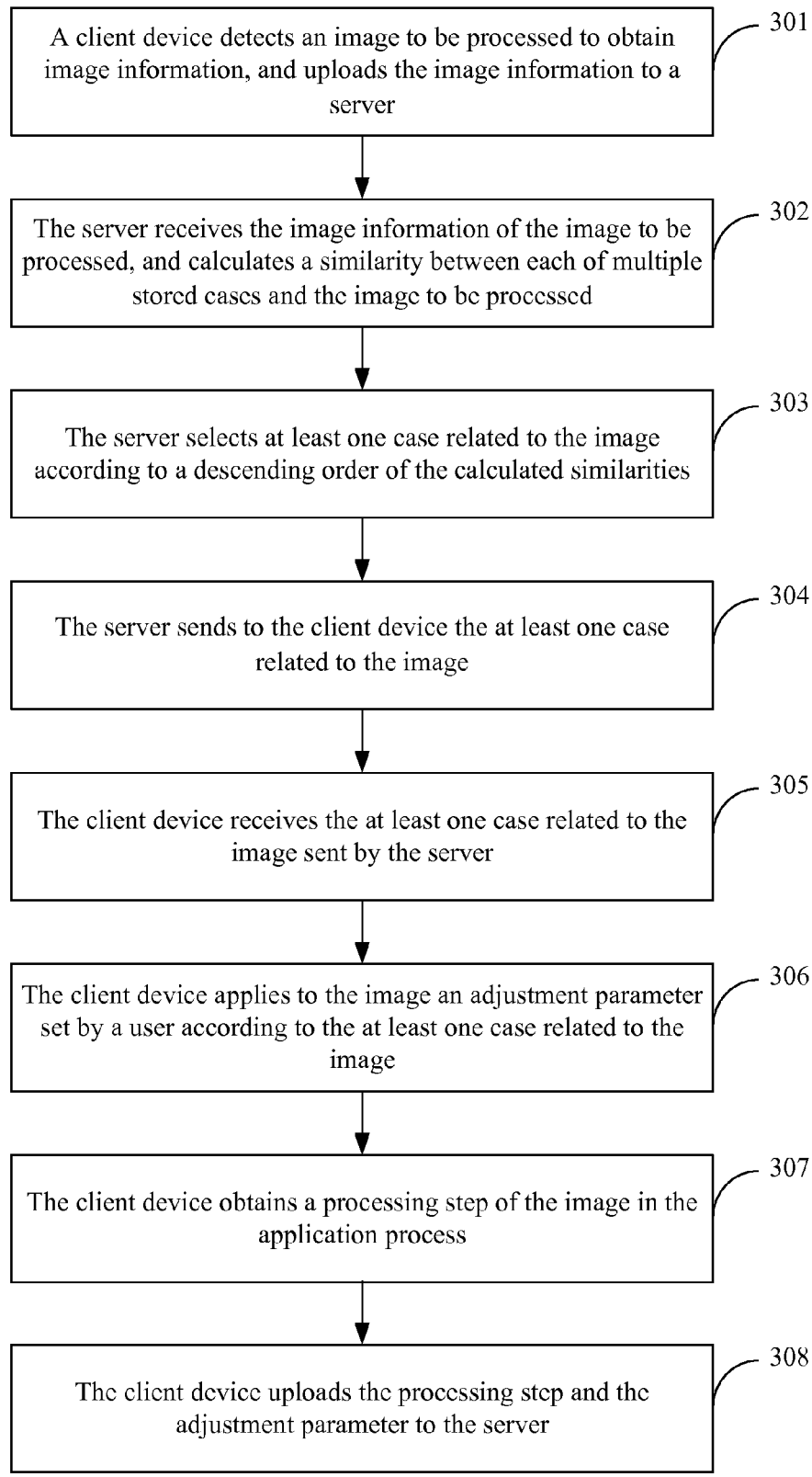
FIG. 3 is a flow chart of an image processing method according to Embodiment 3 of the present invention.

Referring to FIG. 3, this embodiment provides another image processing method, which includes the following steps:

Step 301 to Step 305 are the same as Step 201 to Step 205 in Embodiment 2.

Step 306: The client device applies to the image an adjustment parameter set by a user according to the at least one case related to the image.

The client device may present the received cases on a display interface based on a descending order of the similarities, then receive a parameter set by the user according to a viewed case, and apply the set parameter to the image.

The set adjustment parameter includes at least one of the followings:

(1) white balance adjustment (color gamut such as RGB/CMYK/LAB) parameter, used for performing a white balance adjustment on an image, providing operation interfaces with different operation sub-items and responses for different color gamut;

(2) color temperature adjustment parameter, used for adjusting a color temperature of the image;

(3) effect filter selection and adjustment part, used for performing processing such as noise reduction, blurring, and sharpening on the image;

(4) color space conversion of the image, used for converting a color space of the image;

(5) file and hardware input and output selections of the image, used for selecting an input/output manner of the image;

(6) zooming or other deformation processing, used for processing the size and shape of the image;

(7) mixing and adjustment part of the image, image layer, mask (mask), and the like, used for performing layer mask processing on the image; and (8) batch processing part for single or multiple sheets, used for implementing batch processing for the image.

Step 307: The client device obtains a processing step of the image in the application process.

Step 308: The client device uploads the processing step and the adjustment parameter to the server, and ends the procedure.

If the user confirms to upload the processed image, the client device may further upload the processed image to the server. Specifically, after processing the image, the client device may display a prompt box "Allow uploading this image?" on a display interface. If the user clicks "yes", the client device sends the processed image and the processing step together to the server, or separately sends the processed image and the processing step to the server. If the user clicks "no", the client device notifies the server to delete the unprocessed image in the uploaded image information.

In this embodiment, when receiving information uploaded by the client device, the server stores the received information, where the information includes the image information of the image, the processed image, the corresponding processing step, the adjustment parameter, and so on. Furthermore, the server may perform data conversion on the stored information to obtain a current case, and then carry out a statistical analysis about information classifications on the current case and stored cases, where a method of the statistical analysis belongs to such fields as artificial intelligence, data mining, and pattern recognition, for example, a decision tree is used. A current statistical analysis result is obtained after the data statistical analysis. The server updates the statistical analysis result by replacing a stored statistical analysis result with the current statistical analysis result, so as to add the current case into the stored cases.

Correspondingly, when the server calculates the similarity between each stored case and the image to be processed, the server may first search the stored cases for a case related to the image to be processed according to the image information and the statistical analysis result, and then calculate a similarity between the found case and the image to be processed, so as to reduce the number of cases of which the similarities need to be calculated, thereby significantly reducing the calculation amount of the server, and improving the response speed of the server.

In the image processing method provided by this embodiment, image information of an image to be processed is detected and uploaded to a server; a client device receives the case related to the image sent by the server, and sets parameters of the image according to the case related to the image, thereby improving adjustability during the processing.

In addition, in the present disclosure, Step 206 in Embodiment 2 may combined with Step 306 in Embodiment 3, that is, the effect of the case selected by the client device is applied to the image before the adjustment parameter set by the user is applied to the image; or the adjustment parameter set by the user is applied to the image before the effect of the case selected by the client device is applied to the image. A combination of the two processing manners not only achieves simple and fast image processing but also improves adjustability during the processing.

Embodiment 4

Figure 4:
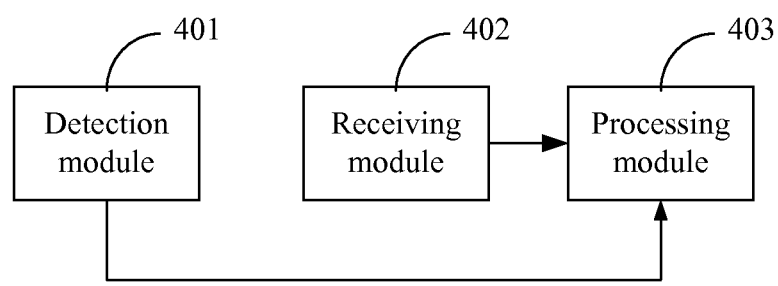
FIG. 4 is a structural diagram of a client device according to Embodiment 4 of the present invention.

Referring to FIG. 4, this embodiment provides a client device, which includes: a detection module 401, a receiving module 402, and a processing module 403.

The detection module 401 is configured to detect an image to be processed to obtain image information, and upload the image information to a server.

The receiving module 402 is configured to receive at least one case related to the image, the at least one case being obtained by the server according to the image information and sent by the server.

The processing module 403 is configured to process the image according to the at least one case related to the image.

The processing module 403 includes:

an effect application unit, configured to apply to the image an effect of a case selected from the at least one case related to the image;

and/or, a parameter adjustment unit, configured to apply to the image an adjustment parameter set by a user according to the at least one case related to the image.

The effect application unit is specifically configured to:

select a case having a highest similarity to the image from the at least one case related to the image; and apply to the image an effect of the case having the highest similarity.

The processing module 403 further includes:

a first processing unit, configured to: after the effect application unit applies to the image the effect of the case selected from the at least one case related to the image, obtain a processing step of the image in the application process, and upload the processing step to the server.

The processing module 403 further includes:

a second processing unit, configured to: after the parameter adjustment unit applies to the image the adjustment parameter set by the user according to the at least one case related to the image, obtain a processing step of the image in the application process, and upload the processing step and the adjustment parameter to the server.

Figure 5:
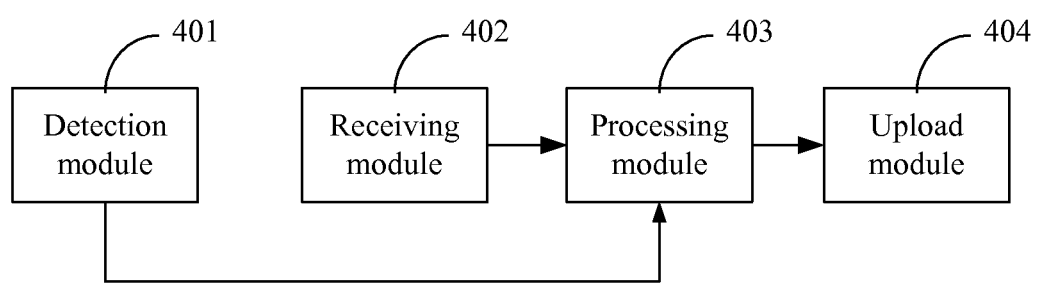
FIG. 5 is a structural diagram of a client device according to Embodiment 4 of the present invention.

Referring to FIG. 5, the client device further includes:

an upload module 404, configured to: after the processing module processes the image according to the at least one case related to the image, upload the processed image to the server if the user confirms to upload the processed image.

In the image processing client device provided by this embodiment, image information of an image to be processed is detected and uploaded to a server; the client device receives cases related to the image sent by the server. According to the received cases related to the image, the client device can directly apply an effect of a selected case to the image, so that the image has the same processing effect as the selected case; alternatively, the client device can also sets parameters of the image, thereby not only achieving simple and fast image processing but also improving adjustability during the processing.

Embodiment 5

Figure 6:
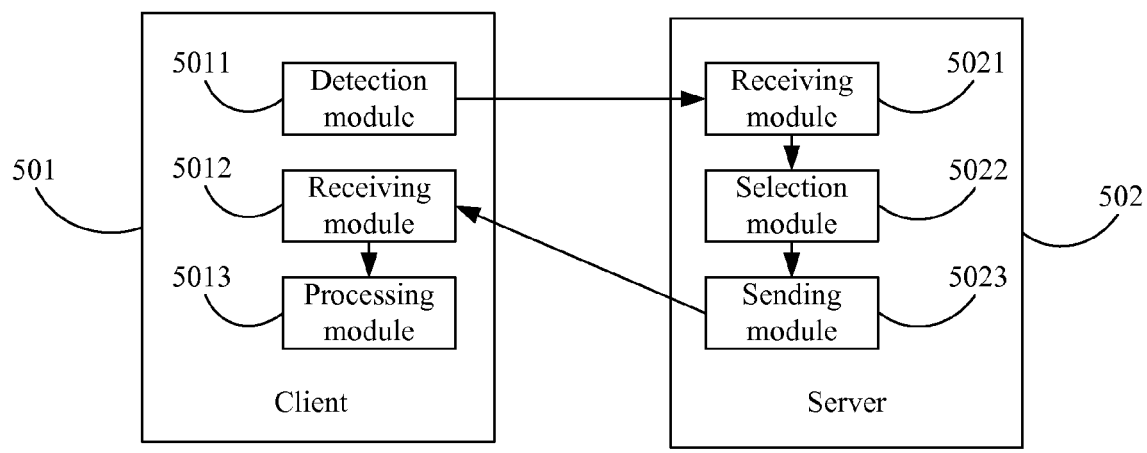
FIG. 6 is a structural diagram of an image processing system according to Embodiment 5 of the present invention.

Referring to FIG. 6, this embodiment provides an image processing system, which includes a client device 501 and a server 502.

The client device 501 includes: a detection module 5011, a receiving module 5012, and a processing module 5013.

The detection module 5011 is configured to detect an image to be processed to obtain image information, and upload the image information to a server;

The receiving module 5012 is configured to receive at least one case related to the image, the at least one case being obtained by the server according to the image information and sent by the server.

The processing module 5013 is configured to process the image according to the at least one case related to the image.

The client device 501 has the same function as the client device in Embodiment 4.

The server 502 includes: a receiving module 5021, a selection module 5022, and a sending module 5023, where the receiving module 5021 is configured to receive image information of an image to be processed sent by the client device;

the selection module 5022 is configured to select at least one case related to the image from multiple stored cases according to the image information; and the sending module 5023 is configured to send to the client device the at least one case related to the image selected by the selection module 5022.

Figure 7:
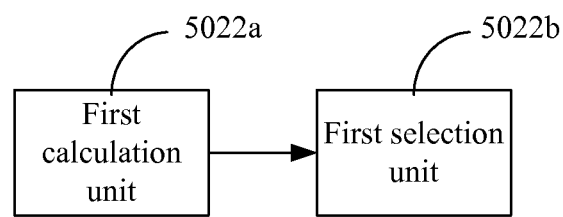
FIG. 7 is a structural diagram of a selection module according to Embodiment 5 of the present invention.

Referring to FIG. 7, the selection module 5022 specifically includes:

a first calculation unit 5022a, configured to calculate a similarity between each of the stored cases and the image according to the image information; and a first selection unit 5022b, configured to select at least one case related to the image according to a descending order of the calculated similarities.

Figure 8:
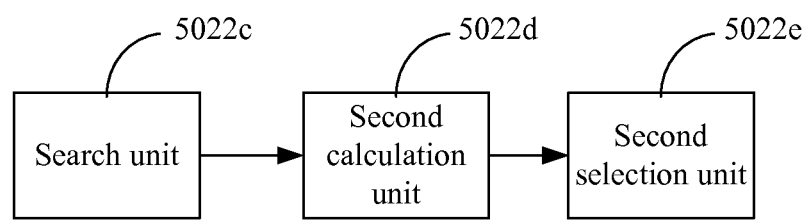
FIG. 8 is a structural diagram of another selection module according to Embodiment 5 of the present invention.

Alternatively, referring to FIG. 8, the selection module 5022 specifically includes:

a search unit 5022c, configured to search the stored cases for a related case according to the image information;

a second calculation unit 5022d, configured to calculate a similarity between each found case and the image according to the image information; and a second selection unit 5022e, configured to select at least one case related to the image according to a descending order of the calculated similarities.

In the image processing system provided by this embodiment, a client device detects image information of an image to be processed, and uploads the image information to a server; the client device receives a case related to the image sent by the server. According to the received case related to the image, the client device can directly apply an effect of a selected case to the image, so that the image obtains the same processing effect as the selected case; alternatively, the client device can set parameters of the image, thereby not only achieving simple and fast image processing but also improving adjustability during the processing.

As noted above (e.g., in connection with FIG. 6), the present disclosure involves a client device and a server deployed in a network environment. The client device can be one of a desktop, a laptop, a smartphone or a tablet. A user can use the client device to upload image-related information including, e.g., information about how an image is captured as well as the image itself, to the server for recommendations from the server on how to further process the image to produce a better image. The server then evaluates the image-related information coming from the client device, identifies a set of images that were captured under similar conditions, and determines a set of image adjustment parameters to be used for adjusting the uploaded image accordingly. Note that the image adjustment may be performed by the server or the client. The description below provides more details on how the server and the client work in concert to process an image.

Figure 9:
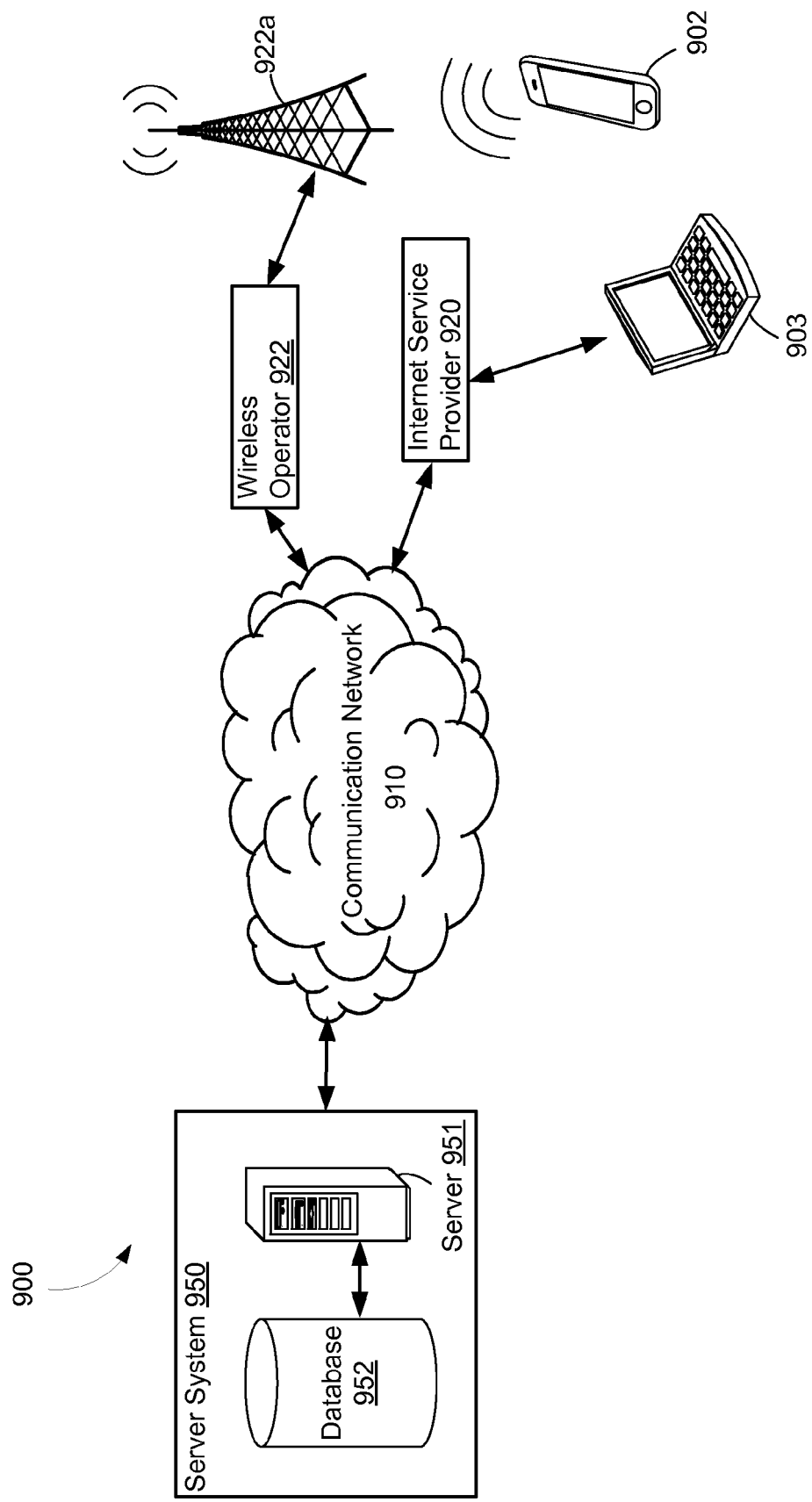
FIG. 9 is a block diagram of a network environment including a sever and a plurality of client devices coupled to the server according to some embodiments of the present invention.

FIG. 9 is a block diagram of a network environment 900 including a sever 950 and a plurality of client devices 902/903 coupled to the server according to some embodiments of the present invention. As shown in the figure, the client device may be a laptop 903 or a smartphone 902. A user at one of the client devices 902 and 903 uploads an image or its associated capture parameters or both to the server system 950 for further process. For example, the user may connect the laptop 903 to a storage device (e.g., a memory stick) that stores multiple images and then chooses one of them to be uploaded into the server system 950. Alternatively, the image may be taken by a camera built-into the smartphone 902. In either case, the client device may have a software application for determining the image capture parameters for the image to be uploaded. As noted above, the image capture parameters may include an exposure value, a light-measure mode, a focus position, ISO (light sensitiveness) data, white balance, image capture time, image capture device information (such as lens information of a camera), a Global Positioning System (GPS) coordinate, and so on. The data is uploaded into the server system 950 through the Internet service provider 920 or the wireless operator 922 as well as the communication network 910.

Within the server system 950, there is a server computer 951 for receiving and processing the received data. For example, using the received image capture parameters, the server computer 951 may submit a query to the database 952 for one or more images having similar capture parameters and then determine how these images were adjusted by respective users. The determination result, e.g., in the form of one or more sets of image adjustment parameters, is returned to the client device that submits the image. Exemplary image adjustment parameters include white balance, color temperature, noise reduction, image blurring, image sharpening, color space conversion, changing size, zooming in/out, etc. In some implementations, the server computer 951 generates multiple versions of the uploaded image by applying different sets of image adjustment parameters to the uploaded image and then returns them to the client device so that the user at the client device can view the effects of different sets of parameters on the same image and choose one of them as his favorite. Alternatively, the server returns the images identified as having similar parameters to the client device (assuming that the owners of these images have agreed to share them with this user). The returned images are displayed on the client device for the user to choose. In response to a user selection of one of the images, a set of image adjustment parameters associated with the user-selected image is then applied to the image that the user wants to modify or process. In either way, the user at the client device is given the option of previewing the same image after being processed using different sets of image adjustment parameters.

In some implementations, the job division between the client device and the server on how to process an image depends in part on the type of client device or the type of network connection the client device has. For example, the server may push more data and responsibility to the client if the client device is a laptop or if the mobile phone has a Wi-Fi connection to the Internet server provider 920. Conversely, the server may take over more responsibility and reduce the amount of data transmission if the mobile phone can only access the server system 950 through the wireless operator 922.

Figure 10:
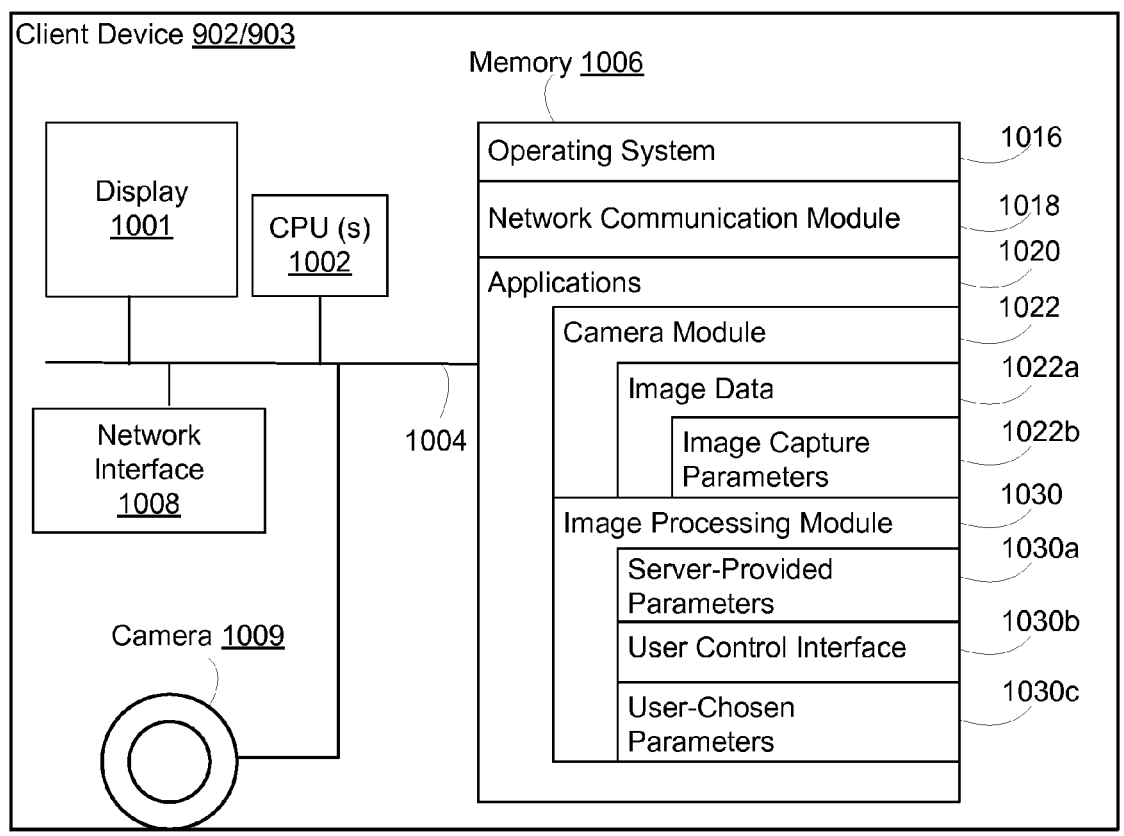
FIG. 10 is a block diagram of a client device according to some embodiments of the present invention.

FIG. 10 is a diagram of an example implementation of a client device 902/903 (e.g., laptop 903 and smartphone 902), discussed above with reference to FIG. 9, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client device 902/903 includes one or more processing units (CPU's) 1002, one or more network or other communications interfaces 1008, a display 1001, memory 1006, a digital camera 1009, and one or more communication buses 1004 for interconnecting these and various other components. The communication buses 1004 may include circuitry (sometimes called a chipset) that interconnects and controls communications between system components. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 may optionally include one or more storage devices remotely located from the CPU(s) 1002. The memory 1006, including the non-volatile and volatile memory device(s) within the memory 1006, comprises a non-transitory computer readable storage medium.

In some implementations, the memory 1006 or the non-transitory computer readable storage medium of the memory 1006 stores the following programs, modules and data structures, or a subset thereof including an operating system 1016, a network communication module 1018, and one or more applications 1020. The operating system 1016 includes procedures for handling various basic system services and for performing hardware dependent tasks. The network communication module 1018 facilitates communication with other devices via the one or more communication network interfaces 1008 (wired or wireless) and one or more communication networks, such as the internet, other wide area networks, local area networks, metropolitan area networks, and so on.

The applications 1020 include a camera module 1022 for capturing images 1022*a* using the camera 1009. In some implementations, the camera module 1022 associates with each image a set of image capture parameters 1022*b*. As noted above, the image capture parameters may be uploaded to and used by the server system for providing recommendations on how to modify the image. The applications 1020 include an image processing module 1030 for processing an image using a set of server-provided parameters 1030*a*. In some implementations, the image processing module 1030 has an user control interface 1030*b* through which the user can modify the server-provided parameters and generate a set of user-chosen parameters 1030*c* for the image. The user control interface 1030*b* may provide user controls over parameters like white balance, color temperature, noise reduction, image blurring, image sharpening, color space conversion, changing size, zooming in/out, etc. For example, the user may use the server-provided parameters 1030*a* to generate an initial result and then revise the result through manual fine-tuning some of the parameters to get a satisfactory result. In some implementations, the user may upload the final image and the associated set of image processing parameters based on the user-chosen parameter (as well as the image capture parameters) to the server system 950 so that other users may be able to benefit from the user-chosen image processing parameters when they process their images that were captured under similar conditions.

Figure 11:
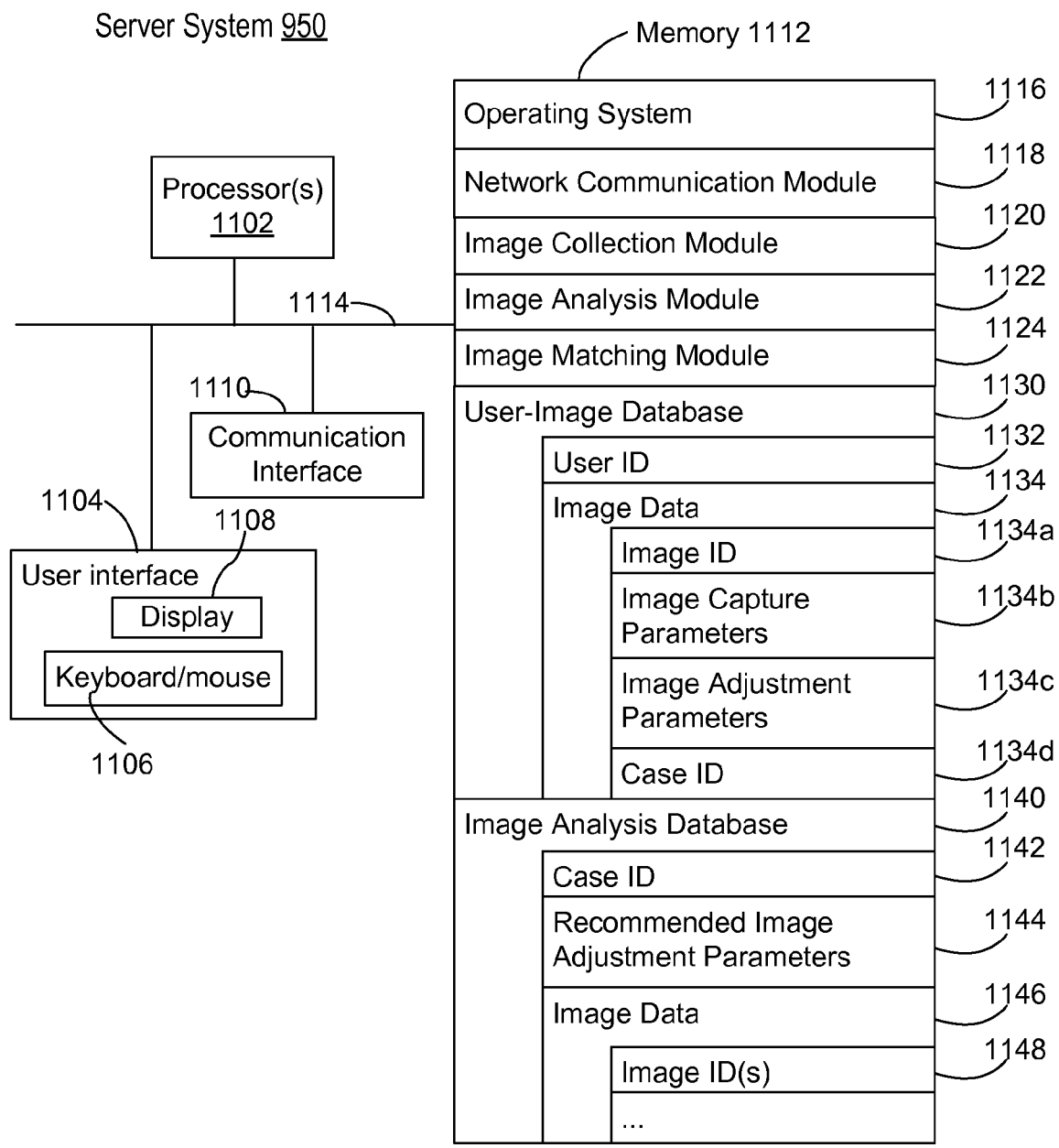
FIG. 11 is a block diagram of a server according to some embodiments of the present invention.

FIG. 11 is a block diagram of different components in the server system 950 according to some embodiments of the present invention. The server system 950 includes memory 1112; one or more processors 1102 for executing modules, programs and/or instructions stored in the memory 1112 and thereby performing predefined operations; one or more network or other communications interfaces 1110; and one or more communication buses 1114 for interconnecting these components. In some implementations, the server system 950 includes a user interface 1104 comprising a display device 1108 and one or more input devices 1106 (e.g., keyboard or mouse). In some implementations, the memory 1112 includes high-speed random access memory, such as DRAM, SRAM, or other random access solid state memory devices. In some implementations, memory 1112 includes non-volatile memory, such as one or more magnetic disk storage devices, optical disk storage devices, flash memory devices, or other non-volatile solid state storage devices. In some implementations, memory 1112 includes one or more storage devices remotely located from the processor(s) 1102. Memory 1112, or alternately one or more storage devices (e.g., one or more nonvolatile storage devices) within memory 1112, includes a non-transitory computer readable storage medium. In some implementations, memory 1112 or the computer readable storage medium of memory 1112 stores the following programs, modules and data structures, or a subset thereof:

- an operating system 1116 that includes procedures for handling various basic system services and for performing hardware dependent tasks;
- a network communications module 1118 that is used for connecting the server system 950 to other computers (e.g., the client devices 902/903 in FIG. 9) via the communication network interfaces 1110 and one or more communication networks (wired or wireless), such as the communication network 910 in FIG. 9, other wide area networks, local area networks, metropolitan area networks, etc.;
- an image collection module 1120 for receiving images uploaded by different users from respective client devices and associating these images with different user identifiers;
- an image analysis module 1122 for performing statistical analysis of the user-provided images and grouping them into different cases based on their respective sets of image capture parameters and image adjustment parameters (e.g., images having similar image capture parameters and image adjustment parameters being grouped together into one case for recommendation purpose);
- an image matching module 1124 for identifying a set of images (which are usually from the same case) for a newly-uploaded image seeking for recommendations and ranking them, e.g., based on their similarities with the newly-uploaded images in terms of their image capture parameters or the popularities of these images in terms of their image adjustment parameters (in other words, an image whose associated set of image adjustment parameters is more often chosen by users is given a higher ranking score);
- a user-image database 1130 including a plurality of user accounts of the server system 950, each user account including a user identifier 1132 that uniquely identifies a user of the server system 950 and image data 1134 uploaded by the user into his account at the server system 950, each uploaded image further including an image identifier 1134a, a set of image capture parameters 1134b, and a set of image adjustment parameters 1134c chosen by the user, and an optional case identifier 1134d indicating which case the image is associated with; and
- an image analysis database 1140 including a plurality of cases of images identified by the image analysis module 1122, each case including a case identifier 1142, one or more sets of recommended image adjustment parameters 1144, and image data 1146 associated with the case, e.g., a plurality of image identifiers 1148, which are used by the server system 950 (or more specifically, the image matching module 1124) for making recommendations to a user at a client device based on their similarities with a user-provided image and respective ranking scores.

It should be noted that the modules, databases, and models in the server system 950 describe above in connection with FIG. 11 may be implemented on a single computer server or distributed among multiple computer servers that are connected by a computer network. Although a specific hardware configuration may affect the performance of the server system 950, the implementation of the present application is not dependent on a particular hardware configuration.

Below is a description of how the server system 950 processes requests from different client devices on how to modify an image based on the image data stored at the server system 950. In some implementations, this process begins with the server system receiving a set of parameters from a client device, the set of parameters including image capture parameters associated with an image stored at the client device. As noted above, this set of image capture parameters may be generated by the camera module of the client device when the camera module takes a picture. Next, the server system performs a similarity analysis between the received image capture parameters and image capture parameters associated with different sets of images. In some implementations, each case of images has an associated set of ranges of image capture parameters. A similarity analysis is conducted based on which of the image capture parameters fall within a corresponding range associated with the case. In some implementations, different image capture parameters are given different weights in this similarity analysis. For example, the exposure value may be given more weight than the image capture device information when determining a set of images as being similar to the user-provided image.

After selecting and ranking a set of images as being similar to the user-provided image, the server system 950 determines one or more sets of image adjustment parameters based on a ranking of the set of images. For example, the server system 950 may choose images that are ranked as the top-five images and identify their associated image adjustment parameters and return them to the client device. Each of the returned set of image adjustment parameters may be applied to the user-provided image so that the user can preview the results of applying different sets of image adjustment parameters to the user-provided image and then select one of his favorite. In some implementations, the server system 950 applies the determined sets of image adjustment parameters to the user-provided image and provides the processing results to the client device for display to the user at the client device. In other words, the server system 950 may return one or more of the set of images to the client device based on the ranking of the set of images, each returned image having an associated set of image adjustment parameters that has been applied to the image before.

In some implementations, instead of or in addition to receiving a set of image capture parameters, the server system 950 receives the image itself from the client device. The server system 950 then determines multiple sets of image adjustment parameters based on a ranking of the set of images. Using the different sets of image adjustment parameters, the server system 950 generates multiple versions of the received image by applying the respective determined sets of image adjustment parameters to the image and then returns the multiple versions of the received image to the client device for the user to choose his favorite. In this case, the server system 950 is responsible for a majority of the job of processing the image and the client device is only responsible for rendering the different versions and then detecting a user selection of one of them and reporting the user selection back to the server system, e.g., in response to a user selection of one of the images.

In some implementations, after returning the determined set of image adjustment parameters, the server system 950 receives the image that has been adjusted and a set of user-chosen image adjustment parameters from the client device, the set of user-chosen image adjustment parameters based on the set(s) of server-provided image adjustment parameters. This image may be generated by a user click of one of the preview images and then optionally further adjusted by the user manually to achieve the best result. The server system 950 adds the image to the user's account at the user-image database 1130. In some implementations, the server system 950 also identifies a case of images for the newly-uploaded image and then updates the set of image adjustment parameters associated with the case using the set of user-chosen image adjustment parameters in accordance with the image capture parameters associated with the newly-upload image. In other words, the composition of a case of image is dynamic and it may vary over time. For example, one case of images may be broken into two cases if the differences between the images meet certain criteria.

Persons of ordinary skill in the art may understand that all or a part of the steps of the foregoing embodiments may be implemented through hardware, or a program instructing related hardware. The program may be stored in a computer readable storage medium. The storage medium may be a read-only memory, a magnetic disk, an optical disk, and the like.

The foregoing descriptions are merely exemplary embodiments of the present invention, and are not intended to limit the present invention. Any modification, equivalent replacement, or improvement made within the spirit and principle of the present invention shall fall within the protection scope of the present invention.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An image processing method performed at a client device having one or more processors and memory for storing programs to be executed by the processors, the method comprising:

detecting by the client device an image to be processed;

obtaining image information of the image to be processed, the image information including a plurality of image capture parameters used for capturing the image;

uploading the plurality of image capture parameters to a server, wherein the server is configured to:
receive the plurality of image capture parameters,
calculate a similarity between each case of stored cases and the image according to the plurality of image capture parameters,
select at least one stored case related to the image according to a descending order of the calculated similarities;
identify a set of image adjustment parameters associated with the at least one stored case related to the image, and
send the at least one stored case related to the image including the set of image adjustment parameters to the client device;

receiving by the client device the at least one stored case related to the image; and processing the image by the client device according to the at least one case related to the image, further including adjusting the image using the set of image adjustment parameters; and displaying the adjusted image on a display of the client device.

2. The method according to claim 1, wherein the processing the image by the client device according to the at least one case related to the image comprises:
   selecting a case from the at least one case related to the image; and
   applying by the client device to the image an image processing effect of the selected case.

3. The method according to claim 2, wherein the applying by the client device to the image the image processing effect of the selected case comprises:
   selecting by the client device a case having a highest similarity to the image from the at least one case related to the image; and
   applying by the client device to the image an image processing effect of the case having the highest similarity.

4. The method according to claim 2, after the applying by the client device to the image the image processing effect of the selected case further comprising:
   obtaining by the client device an image processing step of the image in the application process; and
   uploading by the client device the image processing step and the image processing effect to the server.

5. The method according to claim 1, after adjusting the image using the set of image adjustment parameters further comprising:
   obtaining by the client device an image processing step of the image in the application process; and
   uploading by the client device the image processing step and the set of image adjustment parameters to the server.

6. The method according to claim 1, after the processing the image by the client device according to the at least one case related to the image, further comprising:
   if a user confirms to upload the processed image, uploading by the client device the processed image to the server.

7. The method of claim 1, wherein the plurality of image capture parameters used for capturing the image include at least one of: an exposure value, a light-measure mode, a focus position, ISO data, white balance, image capture time, image capture device information, and a Global Positioning System (GPS) coordinate.

8. The method of claim 1, wherein each of the at least one case includes at least one of: image information, a processed image, corresponding processing steps, and adjustment parameters.

9. An image processing method performed at a server having one or more processors and memory for storing programs to be executed by the processors, the method comprising:
   receiving a set of parameters from a client device, the set of parameters including a plurality of image capture parameters associated with an image stored at and to be processed by the client device, wherein the client device is configured to upload the plurality of image capture parameters to the server via a communication channel;
   selecting and ranking a set of images based on a similarity analysis between the received plurality of image capture parameters associated with the image to be processed and image capture parameters associated with the set of images stored at the server;
   identifying a set of image adjustment parameters related to one of the set of images stored at the server based on a descending order of similarity rankings of the set of images relative to the image to be processed; and
   returning the identified set of image adjustment parameters to the client device,
   wherein the client device is configured to adjust the image stored at the client device using the identified set of image adjustment parameters and display the adjusted image on a display of the client device.

10. The method of claim 9, further comprising:
   after returning the identified set of image adjustment parameters:
   receiving the image adjusted by the client device and a set of user-chosen image adjustment parameters from the client device, the set of user-chosen image adjustment parameters based on the identified set of server-provided image adjustment parameters; and
   updating the identified set of image adjustment parameters using the set of user-chosen image adjustment parameters in accordance with the plurality of image capture parameters associated with the image.

11. The method of claim 9, wherein returning the identified set of image adjustment parameters to the client device further includes returning one or more of the set of images to the client device based on the descending order of similarity rankings of the set of images, each returned image having an associated set of image adjustment parameters.

12. The method of claim 9, wherein receiving a set of parameters from the client device further includes receiving the image to be processed and stored at the client device, the method further comprising:
   determining multiple sets of image adjustment parameters based on a ranking of the set of images;
   generating multiple versions of the received image by applying the respective determined sets of image adjustment parameters to the image; and
   returning the multiple versions of the received image to the client device.

13. The method of claim 12, further comprising:
   receiving a user identification of one of the multiple versions of the image from the client device; and
   updating the set of image adjustment parameters based on the user-identified version of the image.

14. A server comprising:
   one or more processors;
   memory; and
   one or more programs stored in the memory and to be executed by the processors, the programs further including instructions for:
   receiving a set of parameters from a client device, the set of parameters including a plurality of image capture parameters associated with an image stored at and to be processed by the client device, wherein the client device is configured to upload the plurality of image capture parameters to the server via a communication channel;
   selecting and ranking a set of images based on a similarity analysis between the received plurality of image capture parameters associated with the image to be processed and image capture parameters associated with the set of images stored at the server;
   identifying a set of image adjustment parameters related to one of the set of images stored at the server based on a descending order of similarity rankings of the set of images relative to the image to be processed; and
   returning the identified set of image adjustment parameters to the client device,
   wherein the client device is configured to adjust the image stored at the client device using the identified set of image adjustment parameters and display the adjusted image on a display of the client device.

15. The server of claim 14, wherein the programs further include instructions for:
  after returning the identified set of image adjustment parameters:
    receiving the image adjusted by the client device and a set of user-chosen image adjustment parameters from the client device, the set of user-chosen image adjustment parameters based on the identified set of server-provided image adjustment parameters; and
    updating the identified set of image adjustment parameters using the set of user-chosen image adjustment parameters in accordance with the plurality of image capture parameters associated with the image.

16. The server of claim 14, wherein the instruction for returning the identified set of image adjustment parameters to the client device further includes returning one or more of the set of images to the client device based on the descending order of similarity rankings of the set of images, each returned image having an associated set of image adjustment parameters.

17. The server of claim 14, wherein the instruction for receiving a set of parameters from the client device further includes receiving the image to be processed and stored at the client device, and the programs further include instructions for:
  determining multiple sets of image adjustment parameters based on a ranking of the set of images;
  generating multiple versions of the received image by applying the respective determined sets of image adjustment parameters to the image; and
  returning the multiple versions of the received image to the client device.

18. The server of claim 17, wherein the programs further include instructions for:
  receiving a user identification of one of the multiple versions of the image from the client device; and
  updating the set of image adjustment parameters based on the user-identified version of the image.

* * * * *